Patented Dec. 16, 1947

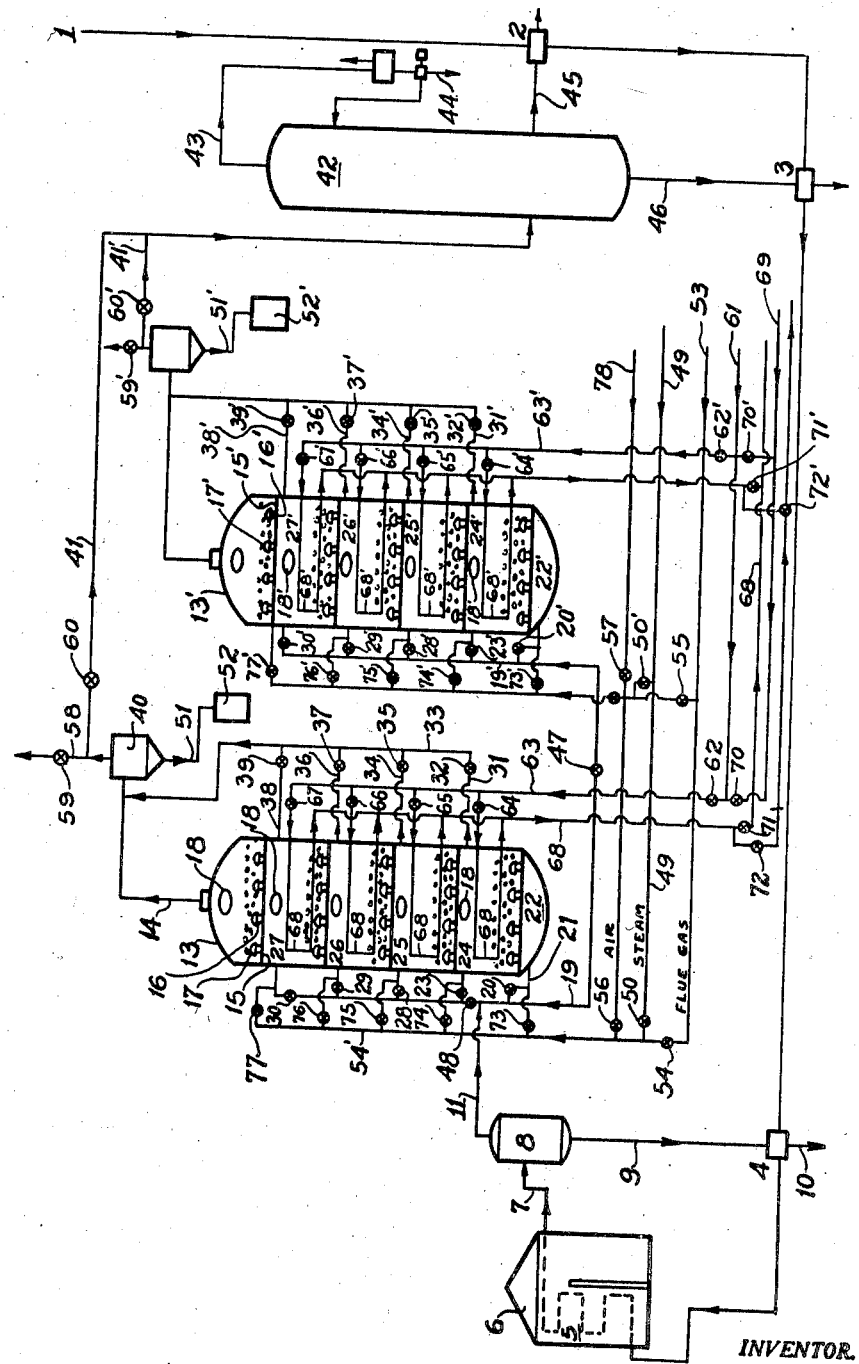

2,432,745

UNITED STATES PATENT OFFICE 2,432,745

CATALYTIC CONVERSION OF HYDROCARBONS

Wright W. Gary, Los Angeles, Calif., assignor to Filtrol Corporation, Los Angeles, Calif., a corporation of Delaware Application May 19, 1944, Serial No. 536,431

5 Claims. (Cl. 196—52)

This invention relates to an improvement in catalytic processes, and particularly in the catalytic conversion of hydrocarbons and to processes of catalytic cracking, reforming, dehydrogenation, isomerization, hydrogenation, cyclization, and alkylation. It is of particular importance in catalytic cracking, that is, in the conversion of higher boiling point oils into those of a low boiling point such as may be suitable for the production of anti-knock motor fuel. More specifically, it relates to a method of and an apparatus for the use of catalysts in such conversion wherein the catalyst while maintained in a zone of reaction or regeneration has imparted to it violent motion and agitation.

Generally described, my invention consists of a catalytic method using apparatus wherein the catalyst is placed on a plurality of superimposed trays within an enclosing shell. Means are provided whereby the flow of reacting and regenerating fluids can pass upwardly through these catalyst beds in series or, alternately, whereby the fluids may pass through said catalyst beds in parallel. In the regeneration of the catalyst, the regeneration gases take the same general path as described for the hydrocarbon reactants, that is, they may flow upwardly through the catalyst beds in series, or alternately, they may pass through the beds in parallel.

The catalyst used in my process is the solid granular type and may be one or more of many commercial forms of catalyst. For example, clays, acid treated clays, silica gels, synthetic magnesium silicates, etc., may be employed. Generally these catalysts are of the inorganic type, more specifically, containing varying amounts of silica and alumina and/or magnesia, together with certain promoting agents as magnesium, chromium, vanadium, etc. Such latter agents may or may not be added, depending on the particular application. Such catalysts are now well known in the catalytic art.

Preferably a granular type of catalyst is used, and it may be obtained by some sizing or preforming operation, as in extrusion of activated clay. The sizing of these particles is preferably from one predominantly of 20 to 60 mesh up to particles of say one-half inch in diameter.

Such granular material is desirable in my process because a gas-lifting principle is employed therein. The catalyst particles are buoyed by the upward flow of reacting gases or regenerating gases, depending on the particular cycle of operation being employed within the catalytic unit. The bed of catalyst may therefore be defined as an unstable bed or a bed of buoyant catalyst particles.

The gas or vapor velocity is of such magnitude that the particles are lifted by gas and made buoyant. The bed is converted into a boiling mass of particles. The particles roll over and over and a uniform contact with vapors and gases results. This boiling mass may be termed a dense phase resulting from the unstable condition of the bed and the buoyancy of the particles due to the high velocities employed. The vapors leave the boiling mass and enter a disengaging space. Catalyst entrained in the vapor leaving the boiling bed is dropped out in the disengaging space and returned to the bed. There is a relatively sharp difference in the concentration of solids in the vapor in the disengaging space and the bed and a consequent substantial difference in density. The disengaging space may then be termed a phase of relatively low density when compared to the high density phase. In order to accentuate the vapor velocities in the beds, the vapors entering the bed may be introduced through nozzles or orifices so that localized high vapor velocities are obtained, which velocities are dissipated by entrance into the bed and the disengaging space. The jets are like a plurality of Venturi jets with localized regions of low pressure at the veni contact, thus assisting in the rolling over and agitation of the bed and in the uniform distribution of vapor through the bed. By employing an unstable bed in which the particles are lifted and rolled, an intimate and uniform contact is obtained between the particular gas being employed and the catalyst particles of the bed. Channelling of gases through the bed is thus avoided. By limiting the vapor velocities through the bed and leaving the bed, the amount of carry-over of solids from the bed into the disengaging space and also into the next succeeding bed or out of the vapor outlet from the unit can be minimized and reduced to insubstantial amounts.

It is an object of my invention to employ apparatus which can effect such conversion of hydrocarbons as well as the regeneration of the catalyst after its normal efficiency has been expended.

It is a further object to provide facilities for using and regenerating this catalyst in the same chamber without the necessity of moving large masses of catalyst through large chambers and conveyors which are expensive to install and operate.

In one embodiment of my invention certain existing refinery equipment can be employed; for example, all refineries have fractionating towers, the majority of which involve bubble trays, although a few have perforated plates. Such equipment can readily be converted to the use of my invention. This is of distinct economic advantage. The trend toward catalytic cracking has made many thermal cracking installations obsolescent. These catalystic units are expensive and involve critical materials with other requirements which make their use prohibitive to the small refiner. The opportunity presented by my process for the refiner, and particularly the small refiner, to convert his obsolescent thermal cracking to catalytic cracking is of particular interest in the present war emergency and is of importance as a national economic measure during peacetime.

It is therefore an object of my invention to provide and describe a method of conversion of said existing refinery equipment whereby it can be readily used, particularly by the small refiner for catalytic cracking operations.

In the drawing, the figure shows a schematic flow diagram of cracking units using my invention.

The charge of petroleum stock is sent through pipe 1 and heat exchangers 2, 3, and 4. It then passes through coil 5 in heater 6 connected by pipe 7 with separator 8. This separator is provided with a bottom draw-off pipe 9 through which may be discharged heavy fractions, tarry material, etc., to pass through heat exchanger 4 through pipe 10. The vaporized fraction leaves the separator through pipe 11, passing into one of two similar reactors which are provided to operate alternately.

The combined reactor and regenerator of my invention consists of a vertical shell 13, with an opening 14 at the top for volatile constituents. Within the shell are a plurality of horizontal trays 15 which are attached to wall of 13. These plates contain a multiplicity of openings. Such trays may be perforated or may carry bubble caps. Risers or nozzles 16 carry bubble caps 17.

Such a combined reactor and regenerator can be conveniently and inexpensively constructed by the use of existing fractionating towers which are conventional equipment in petroleum refineries. The majority of these have bubble trays with risers and bubble caps, as described above, and thus readily serve as a suitable apparatus for the practice of my invention. The conventional downcomers employed for the return of reflux may be covered up by placing a plate or perforated plate over the downcomer. Other forms of trays are now in use and may be employed. In each such tray, the vapor inlets, whether elongated bubble nozzles, cylindrical bubble cap nozzles, or perforations in the trays, act as nozzles for the ascending stream of vapors.

The catalyst is placed on the trays to a depth such as to give a free space about two or more times the height of the dense phase during operation. The greater the height of the disengaging space the more complete the return of entrained solids to the bed. Thus, for a three to five foot spacing between trays, the catalyst is placed to give a static bed of from six inches to one foot in depth. The space above the bed is free; that is, it contains no baffle, screen, or plate above the bed to restrain the free expansion of the bed when it is fluidized and made unstable by the vapor or gas flow.

In addition to the openings for the flow of gas through the riser 16 there also may be one or more larger openings, such as manhole or armhole shown at 18. Such openings are usual in bubble cap towers. In the operation of my invention such a hole serves to charge or to discharge catalyst material, as will be described hereinafter.

In the practice of my invention reactor 13 is charged with catalytic material through manholes 18 which are kept tightly sealed during the operation of this process. The trays may be charged with catalyst by any convenient means, as through elevators, not shown, or pneumatic lifts, etc. The catalyst may be conveniently distributed uniformly across each tray by manual means, as with tools readily available to the refinery operator.

It is to be understood that while, for the sake of simplicity, only a few plates and bubble caps have been shown in the drawing, they may be of a greater number, as, for example, from five to twenty-five. The only requirement for this invention is that there be sufficient chamber space within the reactor to hold the catalyst particles and provide the disengaging space previously described.

The vapors may be introduced in their entirety through valve 20 into chamber 22 below the lowermost plate 15, valves 23, 28, 29, and 30 being closed. The vapors then ascend through all the trays in series and may be removed through line 14. Alternatively, the vapors may be distributed from header 19 to be introduced selectively to various disengaging spaces 24, 25, 26, and 27 in the tower.

Returning now to the vapor flow, vapors issuing from separator 8 pass through pipe 11 into header 19. Valve 48 is open and valve 47 closed. Valve 20 may be opened to permit vapor to flow in controlled amount through pipe 21 into chamber 22. Similarly, valve 23 may be opened to permit vapor to flow through into chamber 24 next above chamber 22. This procedure is also duplicated in the other chambers 25, 26, and 27, as by opening valves 28, 29, and 30.

For example, the reacted vapors from chamber 24 may be discharged through pipe 31, valve 32 into manifold 33 connected with exit pipe 14. Likewise, reactant vapors from chamber 25 may pass through pipe 34 and valve 35 into line 33 to enter pipe 14, as previously mentioned. Vapors from chamber 26 can pass through pipe 36 and valve 37 in a similar manner, while those from chamber 27 may pass through pipe 38 and valve 39 into collection pipe 14. By controlling the back pressure by proper setting of the valves 32, 35, 37, and 39 the desired fraction of the vapors may be withdrawn from each zone and the desired proportion of the vapors may be sent into the next succeeding zone through the nozzles, as described above.

By this incremental addition of vapors and incremental and partial removal of the vapors from each bed or from selected beds, control of the contact time and the catalyst to oil ratio are obtained. This imparts flexibility to the process and permits the control of the depth of cracking and product distribution, i. e., the nature and composition of the products of cracking.

The oil vapors in passing upwardly through the mass of catalytic material are converted, or, if a cracking catalyst is employed under cracking conditions, the oil vapors are cracked into lighter hydrocarbons as before mentioned. After passing through the chamber 22 the gas next passes through the bubble caps on plate 15 into the disengaging space 24 and then in seriatim through the succeeding trays and disengaging spaces.

The vapors in passing through the beds fluidize and unstabilize the beds. The solids are converted into a fluid boiling bed of high density having many similarities to a boiling liquid. The vapors leaving the bed enter the superposed disengaging space in which any entrained solids settle out and are returned to the bed. As a result of attrition and also because ordinary grinding and sizing employed in the manufacture of the granular catalyst do not separate out the finer mesh particles, the bed contains fines which are carried by the vapor and which do not settle out in the free space. These solids are carried by the vapors into the next succeeding bed. It is desirable to reduce this carry-over as much as possible by a close sizing of the particles and by employing catalyst of suitable hardness. Thus, calcined, pelleted, acid-treated clay of the subbentonite clays forms a particularly suitable catalyst for this purpose.

The cracked gases then pass through line 14 into cyclone 40 where catalyst particles which have been carried over by the vapor from the top bed are caught and separated in the cyclone and discharged through pipe 51 into suitable collecting chambers 52'. From cyclone 40 the light overhead petroleum vapors pass through pipe 41, valve 60 being open and 59 being closed, and into fractionator 42. This fractionator may be of usual construction and operation. The light vapors may pass through line 43 for condensation and refluxing, and the condensate is discharged to storage through pipe 44. A side cut may be taken through 45 and tower bottoms discharged through 46.

A description has been given of reactor 13 which is used alternatively with reactor 13' of the same general construction. In the alternate reactor 13', the bubble plates and caps are used in a similar way to that previously described for reactor 13 with the vapor flowing upwardly through the catalyst mass. This second reactor is intended to be used after the catalyst particles in 13 have largely lost their original catalytic effect, at which time they may be regenerated by air or steam. The reactor 13' is likewise filled with catalytic material of the same nature and in the same way as reactor 13.

The flow of hydrocarbon vapors may be discontinued in reactor 13 by closing the valve 48. When this is done the vapors will flow down through pipes 11 and 19 and valve 47 which is open to allow the vapor to flow through header 19'. Here the vapors may be drawn off through valve 20' or selectively passed to the chambers 24', 25', 26', and 27' by control of valves 20', 23', 28', 29', and 30', as described for reactor 13.

It is intended that the flow of vapor as just described will be passing into reactor 13' while reactor 13 is being used as a regenerator.

Steam for purging the catalyst enters by way of line 49, valve 50, into header 52. If desired, especially where steam harms the catalyst, inert gas, such as flue gas, may be passed from line 53 and valve 54 into 54', valve 50 being closed. Steam passes through valve 20 and pipes 21 into chamber 22 where its function is to purge the hydrocarbon vapor from the catalyst particles. In a like manner valve 54 can be opened and valve 55 closed to allow inert gas to pass through pipes 54' and 21 to enter chamber 22. When the reactor has been purged, steam or inert gas flow may be discontinued and air from line 78 alone or mixed with flue gas from line 53 may be introduced by manipulating valves 54 and 56, valves 57 and 55 being closed. The respective valves 73, 74, 75, 76, and 77 opening into chambers 22, 24, 25, 26, and 27 may be opened to utilize the reactivating gas in these particular areas. It will be noted that in a flow of gas vertically in the reactor the oxygen containing gases entering the chamber near the top will have little work to do, whereas there is more regeneration when it enters in one of the lower chambers, as 22. As will be understood, by closing all valves but the lowermost valve 20 oxidation gases may be introduced into the chamber 22 to pass through the length of the tower and exit through 14. Incremental withdrawal of combustion gases can be obtained by controlling opening valves 32, 35, 36, and 39. By properly controlling these valves the gases will pass in desired ratio out of line 14 and through the lines 31, 34, 36, and 38.

The valves 32, 34, 36, and 39 may be opened just to the degree required to obtain a distributed flow of combustion gases from the disengaging space either to the next succeeding chamber or to the line 14. This procedure insures the combustion by gases of controlled oxygen content. Oxygen is consumed by combustion of the coke on the catalyst and the gases passing to the next stage are robbed of oxygen. In ordinary methods of regeneration, where the combustion gases from one zone of the catalyst pass through the succeeding zones, the initial concentration of oxygen must be made high enough to provide the necessary oxygen for the burning of the carbon in the catalyst in the final zone of contact of the gases and catalyst. This frequently results in too much oxygen in the initial stage of contact or too little in the final stage of contact. By my method, each stage may be contacted with just the right amount of oxygen to give the desired rate of burning of the catalyst both for adequate removal of the carbon and for the proper rate of heat generation.

It will be understood that the amount of the gases used in the regeneration stage can be varied in the different chambers; that is, it may be desirable to permit a greater amount of the selected gas or gases to enter the lower chamber. After passing through cyclone 40 the gases may be discharged through pipe 58, valve 59 being open and valve 60 closed, or, if desired, may be recovered for re-use in line 53.

During this regeneration operation in reactor 13, chamber 13' is employed as a reactor in the manner described for 13. After reactor 13 has served as a regenerator, it is again ready for further conversion effects. The flow of vapors from heater 6 may be again routed as previously described.

In transferring from the reactant gases to the purge gases and from purge gases to regeneration gases and from regeneration to purge gases and from such purge gases to reactant gases during the cycle of operation, it will be desirable to gradually add these gases or vapors to the preceding gas or vapor as they are cut down in order to maintain the desired gas or vapor velocity and the desired solids concentration in the beds or disengaging space at all times. Thus, for example, as purge gases are added at the completion of the reaction stage, the hydrocarbon gases are cut down by appropriate manipulation of the valves to maintain the desired flow conditions. The transfer from purge to regeneration to purge to reaction stage is made in like manner.

Reactor 13' which has been used as a reactor while unit 13 was being used as a regenerator can be next subjected to regeneration when the efficiency of the catalyst particles therein is sufficiently low to warrant the operation. The flow of regeneration gases, as air, steam, and/or flue gas, is made in a similar manner to that described for reactor 13.

In catalytic operations as here described, it may be desired to keep the temperature within specified limits. Thus, heat may be added during the reaction period if, as in cracking, the reaction is endothermic, and heat may be abstracted if the reaction is exothermic, as it is during the regeneration when in the burning of the carbon on the particles, if not carefully controlled, an excessive temperature may be obtained that will damage the catalytic material. In the latter case, such temperature control can be effected to some extent by controlling the oxygen concentration and initial temperature of the regeneration gases, or water or steam may be added to the regeneration gases and the latent heat of vaporization of water and the endothermic heat of the water-gas reaction tends to limit the temperature rise. As a supplemental means of effecting this temperature control suitable cooling coils may be provided in each catalyst chamber. The cooling medium enters through pipe 61 and valve 62 or 62' into header 63 from which it is distributed. Preferably these coils are positioned near the plate so as to be in the boiling bed in order to suitably cool as much of the catalyst as possible. After passing through coils 63, by suitable control of valves 64, 65, 66, and 67 the cooling media is discharged through line 68. It may then go to a cooling tower for subsequent use or be dispersed in any other manner desired.

The coils may be used to circulate hot fluid media such as oil, hot gases, superheated steam, etc., which can be heated as desired when heat is needed to maintain or elevate the reaction temperature during the reaction phase. Such heating medium may pass through line 69 to be distributed in the several coils 68.

It will be understood that the valves 62, 70, 71 and 72 and 62', 70', 71' and 72' are appropriately adjusted to route cooling medium to the towers undergoing regeneration and heating medium to the tower acting as a reactor.

The following example is given for purposes of illustrating the operation of my process and apparatus and is not intended as a limitation thereof.

The fractionating tower is filled with catalyst such as described above to provide a static bed of about 6" to 1' on each tray to provide a 4' to 5' free space above the catalyst. A typical mesh analysis of such clay may be about 40 to 60% through a 200 mesh and from 0 to 40% of 20 micron or finer. For example, I may use an acid-activated clay of 90 to 95% through 100 mesh, 50 to 60% through 200 mesh, and from 15 to 25% of 0 to 20 micron material. Gas-oil vapors are passed through the system at a temperature of about 850° F. to 1000° F. and at a vapor velocity of about 1' to 2' per minute. The desirable solids concentration on the bed to unstabilize and fluidize the bed and to give a dense phase may be about 10 to 30 pounds per cubic foot. The absolute magnitude of the density and velocity depends on the shape and particle size of the particles. However, it will be found that there is a critical velocity and density at which the bed will become unstable and the particle lifted to give a dense fluidized phase while producing in the disengaging space a low density phase with but limited carry-over of particles. The converted gases are withdrawn from the unit and fractionated. When the catalytic efficiency of the catalyst is diminished to an uneconomic level the reaction is discontinued and regeneration is carried out, as set forth above, using a gas velocity to give the above described solids concentration on the beds. The temperature of the material on the bed is maintained at about 950° to 1050° F.

Instead of using gas-oil, I may charge crude, naphtha, gasoline or lighter hydrocarbon, depending on the purposes to be accomplished, as described above.

While I have described my process as applying to a particular catalytic process, it is also applicable in other vapor phase catalytic processes. The contactor described above is also applicable to an adsorption process, in which case the adsorption phase is similar to the reaction phase and the desorption or stripping phase is similar to the regeneration phase. Thus, natural gas carrying gasoline may be passed through the unit which is charged with a suitable adsorbent such as carbon black, silica gel, or acid-treated clay and the denuded gas discharged through 14. After the unit has been on stream the desired time, the natural gas is switched to the parallel unit and the saturated adsorbent stripped with steam introduced as previously described and routed through line 41 to the fractionator. In like manner the process may be employed for drying air or removing other adsorbable vapor and gases from other gases and vapors.

While I have described a particular embodiment of my invention for the purpose of illustration, it should be understood that various modifications and adaptations thereof may be made within the spirit of the invention as set forth in the appended claims.

I claim:

1. A process for catalytic conversion of hydrocarbons, which comprises maintaining a plurality of fluidized pools of granular catalyst and hydrocarbon vapors and gases, passing said gases and vapors through said pools at a velocity to maintain said granular catalyst suspended in a dense phase of catalyst and hydrocarbon vapors or gases, disengaging said gases and vapors from said pools, passing said vapors and gases into a disengaging space from which catalyst returns to said pools, maintaining the density of said gases and solids and the concentration of said solids in said disengaging spaces at substantially less than that in said pools, withdrawing solids and vapors from said disengaging spaces, discontinuing the introduction of said vapors and gases into said pools, replacing said gases and vapors by a stream of purge gases and vapors to purge said pools in said disengaging space of said gases and vapors, withdrawing said purge gases from said pools and said disengaging space, discontinuing the introduction of said purge gases into said pools, introducing oxygen containing gases into said pools and withdrawing the products of oxidization from said pools and said disengaging spaces, discontinuing introduction of said oxygen containing gases, replacing said last-named gases in said pools and disengaging spaces by introducing purge gases into said pools and said disengaging spaces, withdrawing said purge gases from said disengaging spaces, maintaining the velocity of purge gases and oxygen containing gases through said pools and said disengaging spaces to maintain said pools in a fluidized condition and to maintain the density of said gases in said disengaging spaces and the concentration of catalyst in said disengaging spaces substantially less than in said pools during said purging and oxidization stages.

2. A process for catalytic conversion of hydrocarbons, which comprises maintaining a plurality of fluidized pools of granular catalyst and hydrocarbon vapors and gases, passing said gases and vapors through said pools at a velocity to maintain said granular catalyst suspended in a dense phase of catalyst and vapors or gases, disengaging said gases and vapors from said pools, passing said vapors and gases into a disengaging space from which catalyst returns to said pools, maintaining the density of said gases and solids and the concentration of said solids in said disengaging spaces at substantially less than that in said pools, withdrawing gases and vapors from said disengaging spaces, introducing said last-named gases and vapors into a next succeeding pool, discontinuing the introduction of said vapors and gases into said pools, replacing said gases and vapors by a stream of purge gases and vapors to purge said pools and said disengaging spaces of said hydrocarbon gases and vapors, withdrawing said purge gases from said pools and said disengaging spaces, introducing said last-named gases and vapors into a next succeeding pool, discontinuing the introduction of said purge gases into said pools, introducing oxygen containing gases into said pools and withdrawing the products of oxidization from said pools and said disengaging spaces, introducing said last-named gases and vapors into a next succeeding pool, discontinuing introduction of said oxygen containing gases, replacing said last-named gases in said pools and disengaging spaces by introducing purge gases into said pools and said disengaging spaces, withdrawing said purge gases from said disengaging spaces, introducing said last-named gases and vapors into a next succeeding pool, and maintaining the velocity of purge gases and oxygen containing gases through said pools and said disengaging spaces to maintain said pools in a fluidized condition and to maintain the density of said gases in said disengaging spaces and the concentration of catalyst in said disengaging spaces substantially less than in said pools during said purging and oxidization stages.

3. A process for catalytic conversion of hydrocarbons, which comprises maintaining a plurality of separate, independent, relatively stationary fluidized pools of granular catalyst and hydrocarbon vapors and gases, passing said gases and vapors through said pools at a velocity to maintain said granular catalyst suspended in a dense phase of catalyst and hydrocarbon vapors or gases, disengaging said gases and vapors from said pools, passing said vapors and gases into a disengaging space from which catalyst returns to said pools, passing vapors and gases from pool to pool through said disengaging space, maintaining the density of said gases and solids and the concentration of said solids in said disengaging spaces at substantially less than that in said pools, withdrawing solids and vapors from said disengaging spaces, discontinuing the introduction of said vapors and gases into said pools, replacing said gases and vapors by a stream of purge gases and vapors to purge said pools in said disengaging space of said gases and vapors, withdrawing said purge gases from said pools and said disengaging space, discontinuing the introduction of said purge gases into said pools, introducing oxygen containing gases into said pools and withdrawing the products of oxidization from said pools and said disengaging spaces, discontinuing introduction of said oxygen containing gases, replacing said last-named gases in said pools and disengaging spaces by introducing purge gases into said pools and said disengaging spaces, withdrawing said purge gases from said disengaging spaces, maintaining the velocity of purge gases and oxygen containing gases through said pools and said disengaging spaces to maintain said pools in a fluidized condition and to maintain the density of said gases in said disengaging spaces and the concentration of catalyst in said disengaging spaces substantially less than in said pools during said purging and oxidization stages.

4. A process for catalytic conversion of hydrocarbons, which comprises maintaining a plurality of separate, independent, relatively stationary fluidized pools of granular catalyst and hydrocarbon vapors and gases, passing said gases and vapors through said pools at a velocity to maintain said granular catalyst suspended in a dense phase of catalyst and vapors or gases, disengaging said gases and vapors from said pools, passing said vapors and gases into a disengaging space from which catalyst returns to said pools, maintaining the density of said gases and solids and the concentration of said solids in said disengaging spaces at substantially less than that in said pools, withdrawing gases and vapors from said disengaging spaces, introducing said last-named gases and vapors into a next succeeding pool, passing gases and vapors from pool to pool through the disengaging space, discontinuing the introduction of said vapors and gases into said pools, replacing said gases and vapors by a stream of purge gases and vapors to purge said pools and said disengaging spaces of said hydrocarbon gases and vapors, withdrawing said purge gases from said pools and said disengaging spaces, introducing said last-named gases and vapors into a next succeeding pool, discontinuing the introduction of said purge gases into said pools, introducing oxygen containing gases into said pools and withdrawing the products of oxidization from said pools and said disengaging spaces, introducing said last-named gases and vapors into a next succeeding pool, discontinuing introduction of said oxygen containing gases, replacing said last-named gases in said pools and disengaging spaces by introducing purge gases into said pools and said disengaging spaces, withdrawing said purge gases from said disengaging spaces, introducing said last-named gases and vapors into a next succeeding pool, and maintaining the velocity of purge gases and oxygen containing gases through said pools and said disengaging spaces to maintain said pools in a fluidized condition and to maintain the density of said gases in said disengaging spaces and the concentration of catalyst in said disengaging spaces substantially less than in said pools during said purging and oxidization stages.

5. A process for catalytic conversion of hydrocarbons, which comprises maintaining a plurality of separate, independent, relatively stationary fluidized pools of granular catalyst and hydrocarbon vapors and gases, passing said gases and vapors through said pools at a velocity to maintain said granular catalyst suspended in a dense phase of catalyst and vapors or gases, disengaging said gases and vapors from said pools, passing said vapors and gases into a disengaging space from which catalyst returns to said pools, maintaining the density of said gases and solids and the concentration of said solids in said disengaging spaces at substantially less than that in said pools, withdrawing gases and vapors from said disengaging spaces, introducing said last-named gases and vapors into a next succeeding pool, passing gases and vapors from pool to pool through the disengaging space, discontinuing the introduction of said vapors and gases into said pools, replacing said gases and vapors by a stream of purge gases and vapors to purge said pools and said disengaging spaces of said hydrocarbon gases and vapors, withdrawing said purge gases from said pools and said disengaging spaces, introducing said last-named gases and vapors into a next succeeding pool, discontinuing the introduction of said purge gases into said pools, introducing oxygen containing gases into said pools and withdrawing the products of oxidization from said pools and said disengaging spaces, introducing a portion of said last-named gases and vapors into a next succeeding pool and withdrawing another portion of the last-named gases and vapors from the disengaging spaces and said pools, discontinuing introduction of said oxygen containing gases, replacing said last-named gases in said pools and disengaging spaces by introducing purge gases into said pools and said disengaging spaces, withdrawing said purge gases from said disengaging spaces, introducing said last-named gases and vapors into a next succeeding pool, and maintaining the velocity of purge gases and oxygen containing gases through said pools and said disengaging spaces to maintain said pools in a fluidized condition and to maintain the density of said gases in said disengaging spaces and the concentration of catalyst in said disengaging spaces substantially less than in said pools during said purging and oxidization stages.

WRIGHT W. GARY.

REFERENCES CITED

The following references are of record in the file of this patent:

UNITED STATES PATENTS

| Number | Name | Date |
| --- | --- | --- |
| 1,845,058 | Pier | Feb. 16, 1932 |
| 2,161,974 | Peck | June 13, 1939 |
| 2,209,973 | Houdry et al. | Aug. 6, 1940 |
| 2,223,268 | Plummer | Nov. 26, 1940 |
| 2,268,187 | Churchill | Dec. 30, 1941 |
| 2,270,903 | Rudbach | Jan. 27, 1942 |
| 2,327,489 | Becker | Aug. 24, 1943 |
| 2,338,573 | Creelman | Jan. 4, 1944 |
| 2,362,621 | Fahnestock | Nov. 14, 1944 |
| 2,364,453 | Layng et al. | Dec. 5, 1944 |
| 2,367,281 | Johnson | Jan. 16, 1945 |
| 2,371,519 | Hartley | Mar. 20, 1945 |